United States Patent
Becker et al.

(10) Patent No.: US 10,922,954 B2
(45) Date of Patent: Feb. 16, 2021

(54) SYSTEM AND METHOD FOR FACILITATING USER INTERACTIONS WITH LIFE SAFETY SYSTEMS

(71) Applicant: Carrier Corporation, Palm Beach Gardens, FL (US)

(72) Inventors: Donald Edward Becker, Bradenton, FL (US); Nageswara Rao Bonam, Hyderabad (IN); Kumara Raja Suseelan, Ponneri (IN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 16/483,134

(22) PCT Filed: Feb. 1, 2018

(86) PCT No.: PCT/US2018/016523
§ 371 (c)(1),
(2) Date: Aug. 2, 2019

(87) PCT Pub. No.: WO2018/144783
PCT Pub. Date: Aug. 9, 2018

(65) Prior Publication Data
US 2020/0234562 A1    Jul. 23, 2020

Related U.S. Application Data

(60) Provisional application No. 62/453,915, filed on Feb. 2, 2017.

(51) Int. Cl.
*G08B 25/14* (2006.01)
*H04W 4/80* (2018.01)
(Continued)

(52) U.S. Cl.
CPC .......... *G08B 25/14* (2013.01); *G06F 3/0482* (2013.01); *G06F 9/542* (2013.01); *H04W 4/80* (2018.02)

(58) Field of Classification Search
CPC ........ G08B 25/14; H04W 4/80; G06F 3/0482; G06F 9/542
(Continued)

(56) References Cited

U.S. PATENT DOCUMENTS 5,189,394 A    2/1993   Walter et al.
5,950,150 A    9/1999   Lloyd et al.
(Continued)

FOREIGN PATENT DOCUMENTS

EP    1515289 A1    3/2005
WO    2009106887 A1    9/2009

OTHER PUBLICATIONS

Honeywell, "Life Safety and Emergency Communications Systems Information Guide", Notifier, 2019, 12 pages.
(Continued)

*Primary Examiner* — Kerri L McNally
(74) *Attorney, Agent, or Firm* — Cantor Colburn LLP

(57) ABSTRACT

A system and method for facilitating user interactions with a life safety system that includes an event panel controller configured to trigger, in response to information received from the one or more life safety system components, an emergency event and insert the triggered emergency event into a queue of active emergency events. The event panel controller is further configured to display an event indication corresponding to the triggered emergency event in an event indicator region of an emergency event graphical user interface (GUI). The event indication is displayed in one of a plurality of event elements of the event indicator region, wherein the one of the plurality of event elements of the
(Continued)

event indicator region displays information of the triggered emergency event. Accordingly, each of the event elements remains visible to a user of the event panel controller during its use. Additional embodiments are described herein.

16 Claims, 9 Drawing Sheets

(51) Int. Cl.
*G06F 3/0482* (2013.01)
*G06F 9/54* (2006.01)

(58) Field of Classification Search
USPC .......................................................... 340/506
See application file for complete search history.

(56) References Cited

U.S. PATENT DOCUMENTS

| | | | |
|---|---|---|---|
| 6,907,300 B2 | 6/2005 | O'Mahoney et al. | |
| 7,046,142 B2 | 5/2006 | Hershkovitz et al. | |
| 7,049,951 B2 | 5/2006 | Rhodes et al. | |
| 7,145,466 B2 | 12/2006 | Haynes et al. | |
| 7,161,481 B2 | 1/2007 | Turner | |
| 7,263,379 B1* | 8/2007 | Parkulo ................. | G08B 21/02 340/501 |
| 7,999,666 B2 | 8/2011 | Barrieau et al. | |
| 8,077,026 B2 | 12/2011 | Jobe et al. | |
| 8,155,767 B2 | 4/2012 | Elmankabady et al. | |
| 8,294,566 B2* | 10/2012 | Morwood ............ | G08B 25/007 340/3.1 |
| 8,854,202 B2 | 10/2014 | Anderson, Jr. et al. | |
| 9,015,020 B2 | 4/2015 | Lontka | |
| 9,317,302 B2 | 4/2016 | Hunt et al. | |
| 2004/0212490 A1* | 10/2004 | Fredericks ............ | G08B 29/08 340/506 |
| 2009/0149153 A1* | 6/2009 | Lee ................... | H04M 1/72541 455/404.1 |
| 2010/0302045 A1 | 12/2010 | Foster | |
| 2011/0246891 A1* | 10/2011 | Schubert ................ | G06F 9/452 715/719 |
| 2013/0321161 A1 | 12/2013 | Chen | |
| 2014/0137024 A1* | 5/2014 | Curtis ..................... | G06F 3/14 715/771 |
| 2015/0142898 A1 | 5/2015 | Piccolo, III | |
| 2015/0348399 A1 | 12/2015 | Cree et al. | |
| 2016/0300460 A1 | 10/2016 | Kulkarni et al. | |

OTHER PUBLICATIONS

International Search Report and Written Opinion for application PCT/US2018/016523, dated Apr. 26, 2018, 10 pages.

Johnson Controls, "Life safety solutions", available at: http://www.johnsoncontrols.com/~/media/jci/be/united-states/security-and-fire-safety/fire-detection-and-alarm-systems/files/publ_4059_fire_family_brochure.pdf?la=en, 2010, 8 pages.

Siemens, "Desigo Fire Safety—control panels for versatile applications", available at: www.siemens.com/desigo-fire-safety, 2012, 3 pages.

* cited by examiner

400

| ALARM 325 | SUP 369 | 04/08/2016 21:23:24 | |
| CALL IN 214 | DISABLE 369 | EMGY 369 | SECURITY 235 |
| BUILDING 156 | GND FAULT 56 | ANCILLIARY | |

| ◀ | ALARM | SUP | CALL IN | DISABLE | ▶ |
| ◀ | ALERT | EVAC | TEST OFF | RESTORE | ▶ |

REPORT ⬅ ➡ PRINT

DETAILS OF ALARM 125

EMERGENCY EVENT TRIGGERED: 04/08/16 @ 21:20:24

LOCATION:

EMERGENCY RESPONSE TEAM:

...

...

OLDEST OUTSTANDING EVENT: ALARM 20 04/08/2016 @ 12:25:05

| ◀ | INFO | ENGLISH | PROJECT TREE | SIGN IN | ▶ |

FIG. 4A

SYSTEM AND METHOD FOR FACILITATING USER INTERACTIONS WITH LIFE SAFETY SYSTEMS

CROSS REFERENCE TO RELATED APPLICATION

The present application is an international patent application, and claims the priority benefit of U.S. Application Ser. No. 62/453,915, filed Feb. 2, 2017, the text and drawings of which are hereby incorporated by reference in its entirety.

TECHNICAL FIELD OF THE DISCLOSED EMBODIMENTS

The presently disclosed embodiments generally relate to life safety systems, and more particularly, to a system and method for facilitating user interactions with life safety systems.

BACKGROUND OF THE DISCLOSED EMBODIMENTS

Life safety systems are designed to monitor the environment of a structure (e.g., a building, a dwelling, etc.) in order to detect emergency events, such as the presence of smoke or fire within the structure. To do so, life safety systems are typically integrated into the structure's infrastructure with various types of sensors that are configured to sense changes in state of the environment in which they are deployed. The sensed changes can be representative of an emergency event for which the life safety system is monitoring for. Generally, life safety systems are managed by a life safety system controller at a control panel of the life safety system.

The controller is configured to monitor information gathered by one or more environment monitoring devices to determine whether the monitored information corresponds to an emergency event, as well as manage actions to be undertaken by other devices of the life safety system that can be used to take action in response to detected emergency events. However, present technologies usable to provide an interface between a user of the controller and the controller itself do a relatively poor job of conveying all of the important state information of the life safety system, which can result in poor visibility of the present state of the life safety system and can impact user response to detected emergency events in times of emergency.

Therefore, there is a need for an improved system and method for facilitating user interactions with life safety systems.

SUMMARY OF THE DISCLOSED EMBODIMENTS

In one aspect, a life safety system interface includes an event panel controller communicatively coupled to one or more life safety system components. The event panel controller is configured to trigger, in response to information received from the one or more life safety system components, an emergency event; insert the triggered emergency event into a queue of active emergency events; display, via a display of the event panel controller, an event indication corresponding to the triggered emergency event in an event indicator region of an emergency event graphical user interface (GUI) rendered to at least a portion of the display, wherein the event indication is displayed in one of a plurality of event elements of the event indicator region, wherein the one of the plurality of event elements of the event indicator region displays information of the triggered emergency event; and wherein each of the event elements remain visible to a user of the event panel controller; and update, via the display, a plurality of GUI elements of one or more selected queue element dependent regions of the emergency event GUI based on the triggered emergency event.

In some embodiments, the event panel controller is communicatively coupled to the one or more life safety system components via a local area network. In other embodiments, the event panel controller is further configured to transmit a notification command to one or more of the life safety system components, and wherein the notification command is usable to perform an action based thereon. In still other embodiments, the event panel controller is further configured render, to the emergency event GUI, the event elements of the event indicator region based on one or more characteristics associated with a type of triggered emergency event represented by that event element. In yet other embodiments, to update the plurality of GUI elements of the one or more selected queue element dependent regions of the emergency event GUI based on the triggered emergency event comprises to update a plurality of option elements of an options menu region of the emergency event GUI, and wherein each of the plurality of option elements corresponds to an option associated with the triggered emergency event.

In some embodiments, to update the plurality of GUI elements of the one or more selected queue element dependent regions of the emergency event GUI based on the triggered emergency event comprises to update one or more GUI elements of an event information region of the emergency event GUI, and wherein the GUI elements of the event information region include an information field to display detailed information associated with one of the active emergency events corresponding to a selected one of the queue elements associated with that one of the active emergency events and an information field type label to identify a type of information displayed in the information field.

In some embodiments, the event panel controller is further configured to display, via the display, a plurality of action elements in an action region of the emergency event GUI, wherein each of the action elements corresponds to one of a setting adjustment interface, an information display, and an authentication interface. In other embodiments, the event panel controller is further configured to display, via the display, information corresponding to at least one active emergency event in a required event information region of the emergency event GUI, wherein information displayed is based on required safety standards associated with a type of the life safety system.

In still other embodiments, the event panel controller is further configured to display, via the display, at least a portion of the queue of active emergency events in a respective one of a plurality of queue elements of an event queue region of the emergency event GUI, wherein the plurality of queue elements of the event queue region includes one queue element of the plurality of queue elements to display information of the triggered emergency event; and wherein each of the plurality of queue elements remain visible to a user of the event panel controller during use of the event panel controller.

In another aspect, a method for facilitating user interactions with a life safety system interface of an event panel controller includes triggering, by the event panel controller and in response to having received information from one or more life safety system components, an emergency event; inserting, by the event panel controller, the triggered emergency event into a queue of active emergency events; displaying, via a display of the event panel controller, an event indication corresponding to the triggered emergency event in an event indicator region of an emergency event graphical user interface (GUI) rendered to the display, wherein the event indication is displayed in one of a plurality of event elements of the event indicator region, wherein the one of the plurality of event elements of the event indicator region displays information of the triggered emergency event; and wherein each of the event elements remain visible to a user of the event panel controller during use of the event panel controller; and updating, via the display, a plurality of GUI elements of one or more selected queue element dependent regions of the emergency event GUI based on the triggered emergency event.

In other embodiments, the event panel controller is communicatively coupled to the one or more life safety system components via a local area network. In still other embodiments, the method further includes transmitting, by the event panel controller, a notification command to one or more of the life safety system components, and wherein the notification command is usable to perform an action based thereon. In yet other embodiments, the method further includes rendering, by the event panel controller, the event elements of the event indicator region of the emergency event GUI based on one or more characteristics associated with a type of triggered emergency event represented by that event element.

In some embodiments, updating the plurality of GUI elements of the one or more selected queue element dependent regions of the emergency event GUI based on the triggered emergency event comprises updating a plurality of option elements of an options menu region of the emergency event GUI, and wherein each of the plurality of option elements corresponds to an option associated with the triggered emergency event. In other embodiments, updating the plurality of GUI elements of the one or more selected queue element dependent regions of the emergency event GUI based on the triggered emergency event comprises updating one or more GUI elements of an event information region of the emergency event GUI, and wherein the GUI elements of the event information region include an information field to display detailed information associated with one of the active emergency events corresponding to a selected one of the queue elements associated with that one of the active emergency events and an information field type label to identify a type of information displayed in the information field.

In some embodiments, the method further includes displaying, via the display, a plurality of action elements in an action region of the emergency event GUI, wherein each of the action elements corresponds to one of a setting adjustment interface, an information display, and an authentication interface. In other embodiments, the method further includes displaying, via the display, required information in a required event information region of the emergency event GUI, wherein the required information corresponds to at least one active emergency event, and wherein the required information displayed is based on required safety standards associated with an application type of the life safety system.

In still other embodiments, the method further includes displaying, via the display, at least a portion of the queue of active emergency events in a respective one of a plurality of queue elements of an event queue region of the emergency event GUI, wherein the plurality of queue elements of the event queue region includes one queue element of the plurality of queue elements to display information of the triggered emergency event; and wherein each of the plurality of queue elements remain visible to a user of the event panel controller during use of the event panel controller.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein:

FIGS. 4A-4G show an illustrative life safety system interface for facilitating interactions between the controller of FIG. 2 and a user.

DETAILED DESCRIPTION OF THE DISCLOSED EMBODIMENTS

Figure 1:
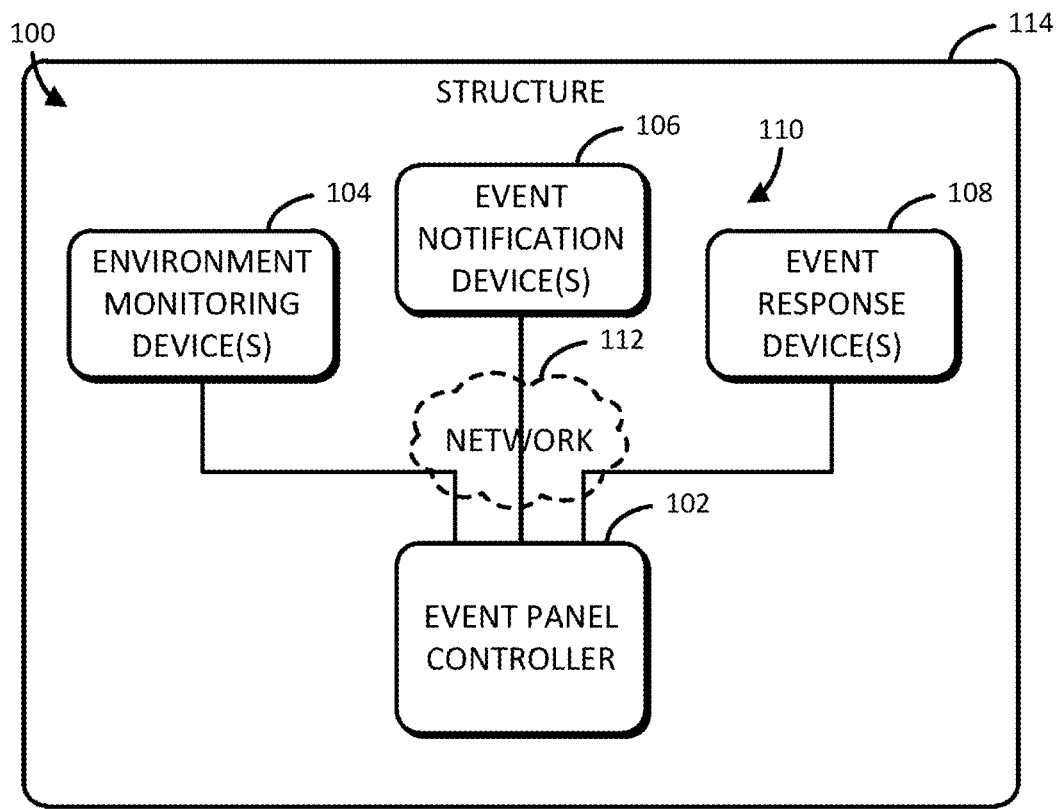
FIG. 1 is a schematic block diagram of an illustrative embodiment of a life safety system for facilitating user interactions with life safety systems that includes a controller communicatively coupled to one or more environment monitoring devices, one or more event notification devices, and one or more auxiliary devices.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

FIG. 1 illustrates a life safety system 100 that has been integrated into the infrastructure of a structure 114, such as dwelling, office, warehouse, etc., in order to manage operations of the life safety system 100 to ensure the safety of building inhabitants, facilitate building evacuation, and aid in response and rescue operations. In other words, the life safety system 100 is setup or otherwise configured to protect and preserve human life during an emergency or failure of a critical building system, such as a fire, an earthquake, a security incident, a power failure, and/or any other type of potentially life-threatening emergency.

To manage such operations, the life safety system 100 includes an event panel controller 102 communicatively coupled to one or more environment monitoring devices 104, one or more event notification devices 106, and one or more event response devices. It should be appreciated that each of the environment monitoring devices 104, the event notification devices 106, and/or the event response devices 108, collectively, the life safety system components 110 of the life safety system 100, may be communicatively coupled to the event panel controller 102 via a network 112, via a direct coupling (e.g., wires, cables, etc.), or a combination thereof.

In use, as will be described in further detail below, the event panel controller 102 renders a graphical user interface (GUI) (see, e.g., the emergency event GUI 400) for display (e.g., via a touchscreen display of the event panel controller 102) to a user. Accordingly, that GUI is usable by the user (e.g., an administrator, an emergency responder, etc.) to provide an indication of whether a present state of one or more components of the life safety system 100 have triggered an emergency event, as well as facilitate user interactions such that the user can review/respond to triggered emergency events. However, unlike present life safety system controller technologies, the event panel controller 102 as described herein displays a GUI that is representative of the entire state of the life safety system 100 in a single screen. As such, a user is presented with the necessary system critical information to assess the emergency event and navigate the GUI of the event panel controller 102 in times of emergency with fewer interactions with the GUI than present life safety system controller technologies allow.

Figure 2:
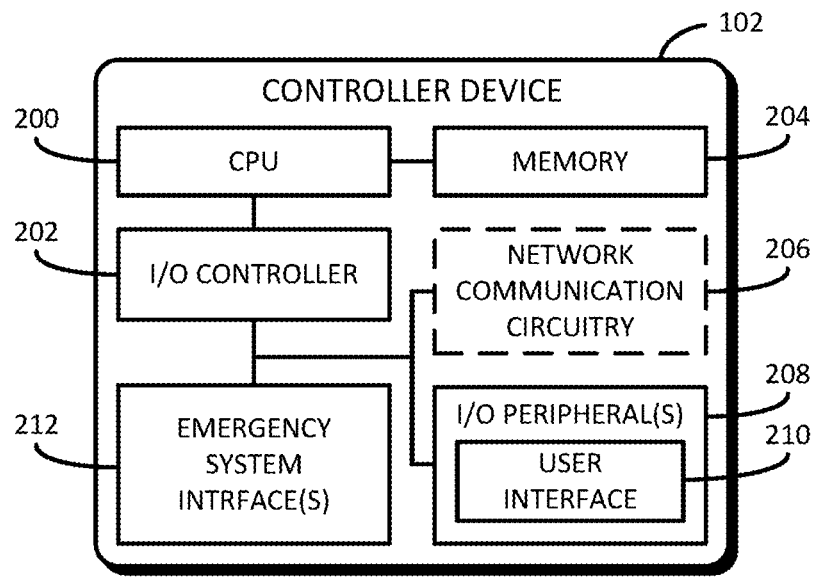
FIG. 2 is a block diagram of an illustrative embodiment of the controller of the life safety system of FIG. 1.

The event panel controller 102 may be comprised of any combination of firmware, software, hardware, and/or circuitry capable of performing the functions described herein. Referring now to FIG. 2, an embodiment of an illustrative event panel controller 102 is shown. The illustrative event panel controller 102 includes a CPU 200, an input/output (I/O) controller 202, a memory 204, one or more I/O peripherals 208, and one or more emergency system I/O interfaces 212, as well as, in some embodiments, a network communication circuitry 206. It should be appreciated that alternative embodiments may include additional, fewer, and/or alternative components to those of the illustrative event panel controller 102, such as may be found in a typical controller device. It should be additionally appreciated that one or more of the illustrative components may be combined on a single system-on-a-chip (SoC) on a single integrated circuit (IC).

The CPU 200 may be embodied as any type of hardware or combination of circuitry capable of processing data. Accordingly, the CPU 200 may include one or more processing cores (not shown) in a single-core processor or a multi-core processor architecture capable of reading and executing program instructions. In some embodiments, the CPU 200 may include cache memory (not shown) that may be integrated directly with the CPU 200 or placed on a separate chip with a separate interconnect to the CPU 200. It should be appreciated that, in some embodiments, pipeline logic may be used to perform software and/or hardware operations (e.g., network communication operations), rather than commands issued to/from the CPU 200.

The I/O controller 202, or I/O interface, may be embodied as any type of computer hardware or combination of circuitry capable of interfacing between input/output devices and the event panel controller 102. Illustratively, the I/O controller 202 is configured to receive input/output requests from the CPU 200, and send control signals to the respective input/output devices, thereby managing the data flow to/from the event panel controller 102.

The memory 204 may be embodied as any type of computer hardware or combination of circuitry capable of holding data and instructions for processing. Such memory 204 may be referred to as main or primary memory. It should be appreciated that, in some embodiments, one or more components may have direct access to memory, such that certain data may be stored via direct memory access (DMA) independently of the CPU 200.

The network communication circuitry 206 may be embodied as any type of computer hardware or combination of circuitry capable of managing network interfacing communications (e.g., messages, datagrams, packets, etc.) via wireless and/or wired communication modes. Accordingly, in some embodiments, the network communication circuitry 206 may include a network interface controller (NIC) capable of being configured to connect the event panel controller 102 to a computer network (e.g., the network 106).

The one or more I/O peripherals 208 may be embodied as any auxiliary device configured to connect to and facilitate communications to/from the event panel controller 102. For example, the I/O peripherals 208 may include, but are not limited to, a touchpad, a keypad, a keyboard, a microphone, one or more buttons, a display (e.g., a liquid crystal diode (LED) display), a touchscreen, a speaker, one or more illuminating components (e.g., light emitting diode(s) (LEDs)), etc. Accordingly, it should be appreciated that some I/O devices are capable of one function (i.e., input or output), while others are capable of performing both functions (i.e., input and output). The illustrative I/O peripherals 208 includes a user interface 210, such as a touchscreen, that is usable to render an interface for display to a user and receive input from the user in response to user interaction (e.g., via a finger, stylus, etc.) with the user interface 210.

The emergency system I/O interface(s) 212 may include any combination of firmware, software, hardware, wiring, and/or circuitry capable of performing the functions described herein, including receiving environment information from the environment monitoring devices and transmitting control information to the event notification devices 106 and/or the event response devices 108 of the life safety system 100. For example, the emergency system I/O interface(s) 212 may include one or more control boards for interfacing with the environment monitoring devices 104, the event notification devices 106, and/or the event response devices 108 of the life safety system 100.

Referring back to FIG. 1, the environment monitoring devices 104, the event notification devices 106, and the event response devices 108 may be embodied as any type of device capable of performing the functions described herein, relative to their intended purpose. It should be appreciated that one or more components of the environment monitoring devices 104, the event notification devices 106, and the event response devices 108 may be like components to one or more of the components of the illustrative event panel controller 102 of FIG. 2. Such like components may include a CPU, memory, an I/O controller, network communication circuitry, I/O peripherals, etc. Accordingly, the like components are not described herein to preserve clarity of the description. It should be appreciated that such like components may differ based on the type of device and its intended purpose. As such, additional and/or alternative components, such as those components typically associated with that type of device may be included in the respective device. It should be further appreciated that some components of the event panel controller 102, such as the emergency system I/O interface(s) 212, may be exclusive to the event panel controller 102.

The one or more environment monitoring devices 104 may include any combination of firmware, software, hardware, and/or circuitry capable of performing the functions described herein, such as detecting a present condition and events/changes in the environment of the structure 114. For example, the environment monitoring devices 104 may include, but are not limited to, particulate matter sensors, temperature/heat sensors, motion sensors, fault detection sensors, carbon dioxide sensors, current sensors, dew point sensors, pressure sensors, sprinkler flow switches, etc. In some embodiments, the environment monitoring devices 104 may include one or more manually operated devices configured to initiate or otherwise trigger an emergency event, such as a manual pull station, a manual call point, etc. While the environment monitoring devices 104 are illustratively shown internal to the structure 114, it should be appreciated that, in some embodiments, one or more of the environment monitoring devices 104 may be located external to the structure 114.

The one or more event notification devices 106 may include any combination of firmware, software, hardware, and/or circuitry capable of performing the functions described herein, such as providing a visual and/or audible indication of an emergency event (i.e., an alarm condition exists). Accordingly, the event notification devices 106 may include, but are not limited to, bells, horns, lights, speakers, strobes, etc.

The event response devices 108 may include any combination of firmware, software, hardware, and/or circuitry capable of performing the functions described herein, such as performing a reactionary action subsequent to detection of an emergency event. Such event response devices 108 include fire suppressant systems that control water sprinklers or halon valves, door openers/closers, stairwell pressurization systems, and ventilation dampers, to name a few non-limiting examples.

As described previously, in some embodiments, one or more of the environment monitoring devices 104, the event notification devices 106, and/or the event response devices 108 may be communicatively coupled to the event panel controller 102 via the network 112 using various wired (e.g., Ethernet, token ring, etc.) and/or wireless (e.g., Bluetooth®, Wi-Fi®, wireless broadband, ZigBee®, etc.) technologies and associated protocols. Accordingly, the network 112 may be implemented as any type of wired and/or wireless network, such as a local area network (LAN), a personal area network (PAN), a controller area network (CAN), etc.

To manage the network communications, the network 112 may include one or more communicatively coupled network computing devices (not shown) for facilitating the flow and processing of network communication traffic via a series of interconnects. Such network computing devices may include, but are not limited to, one or more access points, routers, switches, servers, compute devices, storage devices, etc. It should be appreciated that, in some embodiments, the network 112 may be further connected to another network, such as a wide area network (WAN), a global network (the Internet), etc.

Figure 3:
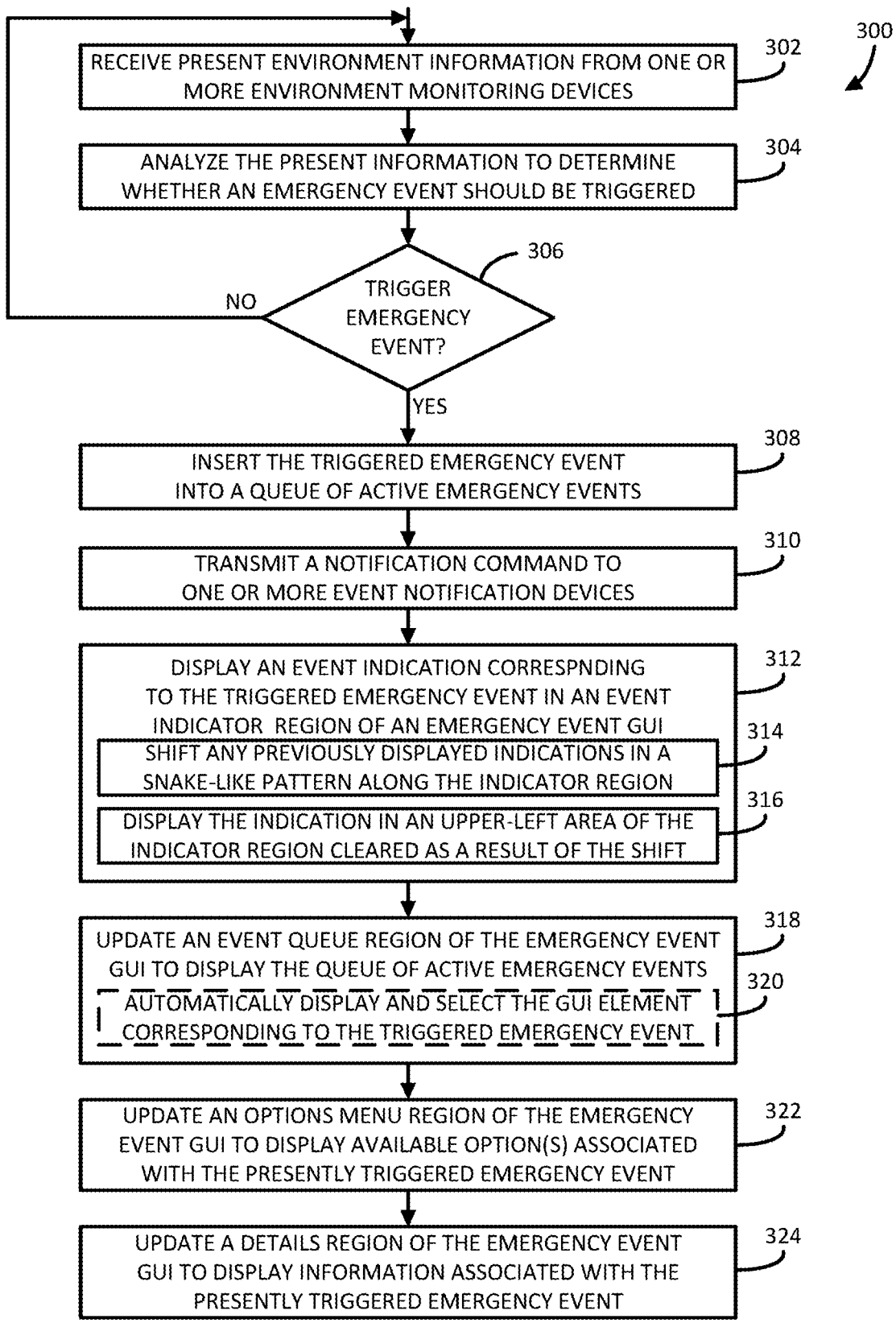
FIG. 3 is a schematic flow diagram of an illustrative embodiment of a method for facilitating user interactions with the life safety system of FIG. 1 that may be performed by the controller of FIG. 2.

Referring now to FIG. 3, an illustrative method 300 is provided for facilitating user interactions with the life safety system 100 that may be performed by the event panel controller 102. The method 300 begins in step 302 in which the event panel controller 102 receives present information of the environment of the structure 114 (i.e., environment information) from at least one of the environment monitoring devices 104. As described previously, the environment monitoring devices 104 can include a number of different types of sensors, switches, and/or manually operated devices. As such, the environment information may include any data capable of being captured by the respective environment monitoring devices 104 from which the environment information is received.

In step 304, the event panel controller 102 analyzes the present information to determine whether an emergency event should be triggered. In an illustrative example, the event panel controller 102 may compare one or more present environment values received with the environment information against a corresponding threshold (e.g., a minimum threshold value, a maximum threshold value, a threshold value range, etc.). Accordingly, based on the comparison, the event panel controller 102 can make the determination whether one or more of the present environment values are indicative of an emergency event.

In step 306, the event panel controller 102 determines whether an emergency event should be triggered based on a result of the analysis performed at step 304. For example, the event panel controller 102 may determine that one or more of the present environment values is less than a minimum threshold value, is greater than a maximum threshold value, falls outside of an acceptable threshold value range, etc. If the event panel controller 102 determines that an emergency event should not be triggered, the method 300 returns to step 302; otherwise, the method 300 proceeds to step 308. In step 308, the event panel controller 102 inserts the triggered emergency event, or a reference thereto, into a queue of active emergency events.

In step 310, the event panel controller 102 transmits a notification command to one or more event notification devices 106. The notification command may be any type of message the receiving event notification device 106 can receive, interpret, and perform an operation associated with the event. For example, in an embodiment in which the receiving event notification device 106 is an alarm, the notification command may include an indication that the alarm is to be active (e.g., emit an audible noise, a visible light, etc.). In another example, the notification command may include text that is usable by the receiving event notification device 106 to read audibly and/or display textually, depending on the capability of that event notification device 106.

In step 312, the event panel controller 102 displays an event indication corresponding to the triggered emergency event in an event indicator region of an emergency event GUI. Referring now to FIGS. 4A-4G, an illustrative emergency event GUI 400 is shown. It should be appreciated that the life safety system interfaces of the illustrative emergency event GUI 400 as described herein for facilitating the user interactions (e.g., displaying life safety system 100 related data and receiving user inputs) are intended to represent graphical user interfaces (GUIs) which allow the user to interact with the application referred to herein through GUI controls, graphical images, and visual indicators (collectively, the GUI elements), such as may be rendered to the user interface 210 of the event panel controller 102.

For example, FIG. 4A shows an illustrative example of the illustrative emergency event GUI 400 in use. It should be appreciated that, in some embodiments, the GUI elements of the emergency event GUI 400 may be rendered differently based on the type of GUI element (e.g., flat button type versus 3-dimensional button type), a present state of a GUI element (e.g., selected or not selected, enabled or disabled, etc.), as well as a type of information represented by the respective GUI element (e.g., a type of indication, a priority associated with a particular type of information, etc.).

Figure 4B:
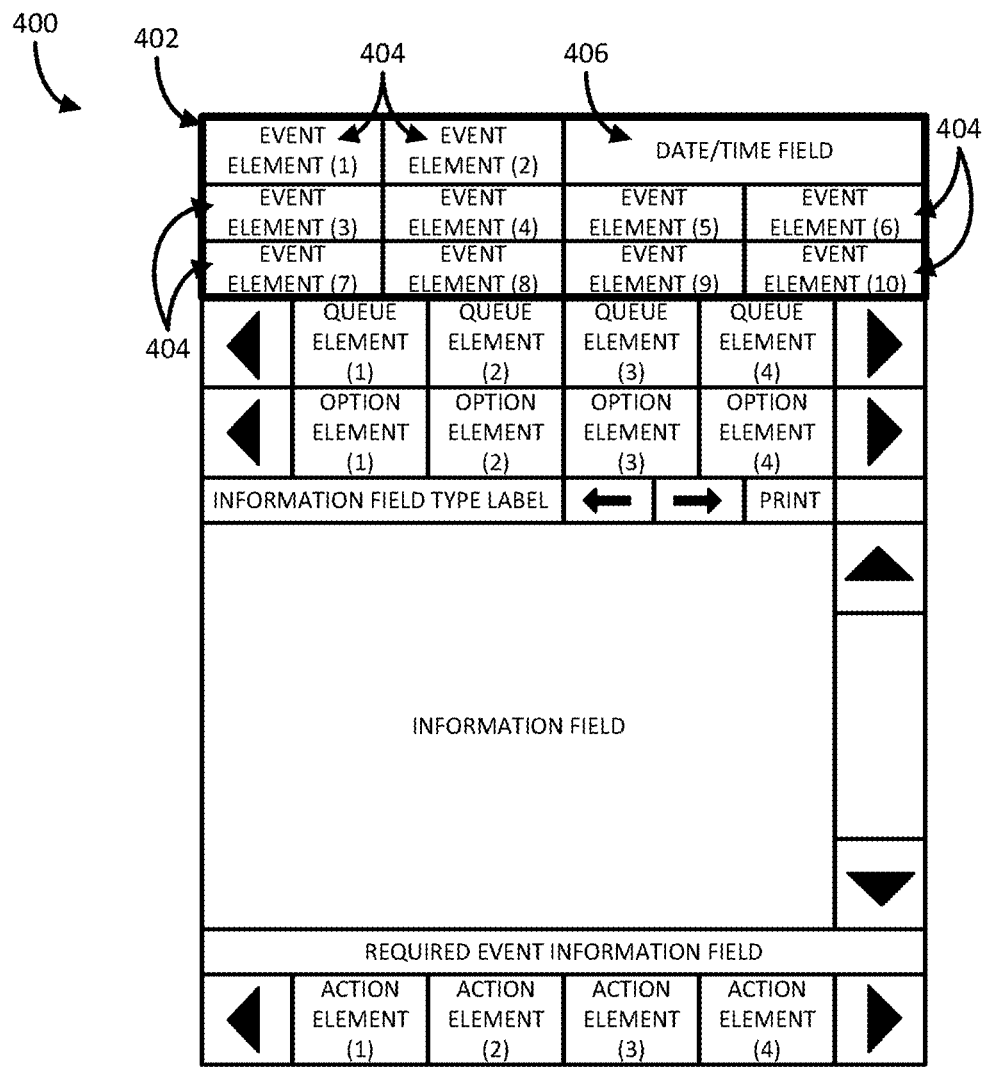

As shown in FIG. 4B, an illustrative event indicator region 402 includes event elements 404 for displaying event indications and a date/time display field 406 for displaying a present date and time of day. The illustrative event elements 404 include a first event element, designated as event element (1), a second event element, designated as event element (2), and so on to a tenth element, designated as event element (10). It should be appreciated that not all of the event elements 404 have a reference line directed thereto, in order to preserve clarity of the illustration. It should be further appreciated that while ten event elements are displayed in the illustrative event indicator region 402, additional or fewer event elements may be displayed in other embodiments.

In some embodiments, the number of rows of event elements 404 in the event indicator region 402 displaying the event elements 404 may be dynamically adjusted based on the number of event indications to be displayed. For example, in an embodiment in which only two event indications are to be displayed, only the first row of event elements 404 (i.e., event element (1) and event element (2)) may be displayed. In furtherance of the example, the second and third rows of event elements 404 (i.e., event element (3) through event element (6) and event element (7) through event element (10), respectively) may be hidden such that an event queue region 408 of the emergency event GUI 400, described below, is displayed directly below the first row of event elements 404.

Referring again to FIG. 4A, the characteristics (e.g., fill color, font type, etc.) of the event elements 404 may be based on the type of event (e.g., classified as alarm, emergency, suppressant, security, ground fault, building, call in, etc.) being represented by the respective event element 404. In an illustrative embodiment, the event types alarm and emergency may be higher priority event types, such that a background color (e.g., red) is applied to the respective GUI element to denote their level of importance. It should be appreciated that, in some embodiments, such characteristics may be based on requirements (e.g., federal, state, local, etc.) relevant to that particular type of life safety system 100 in which the event panel controller 102 is integrated.

Referring back to the method 300 of FIG. 3, to display the event indication, in step 314, the event panel controller 102 shifts any previously displayed indications (i.e., displayed indications of previously triggered emergency event presently in the queue of active emergency events) in a snake-like pattern along the event indicator region 402. For example, referring again to FIG. 4B, a previously triggered emergency event displayed in the first event element (i.e., event element (1)) of the event elements 404 is shifted to the right for display in the second event element (i.e., event element (2)) of the event elements 404, while the previously triggered emergency event displayed in the second event element is shifted down a row and to the far-left location of the third event element (i.e., event element (2)) of the event elements 404, and so on.

Referring back to FIG. 3, in step 316, the event panel controller 102 additionally displays the event indication associated with the presently triggered emergency event in the first event element. Referring again to FIG. 4B, it should be appreciated that, if the tenth event element (i.e., event element (10)) was displaying a previously triggered emergency event (i.e., each of the event elements 404 were displaying a previously triggered emergency event) prior to the presently triggered emergency event being displayed in the first event element, the previously triggered emergency event will no longer be displayed in the event indicator region 402.

Figure 4C:
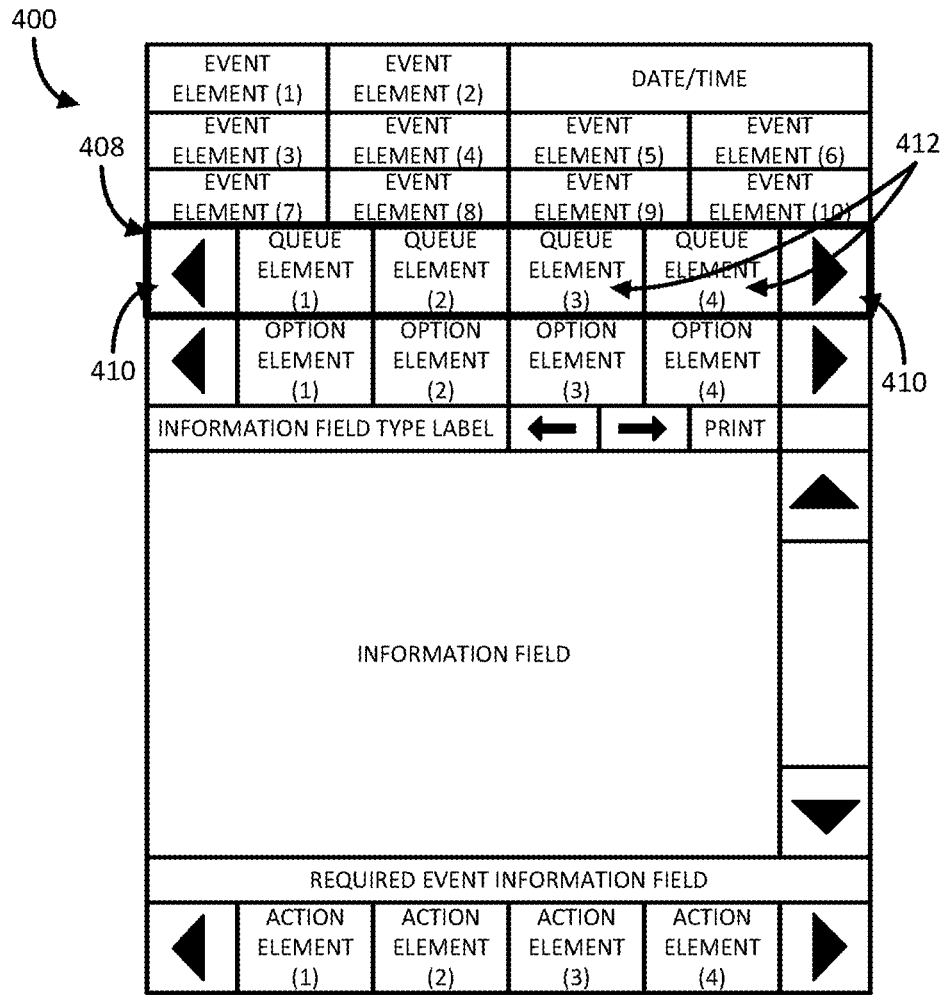

Referring back to FIG. 3, in step 318, the event panel controller 102 updates an event queue region of the emergency event GUI 400 to display the queue of active emergency events to include the presently triggered emergency event inserted into the queue of active emergency events in step 308. For example, as shown in FIG. 4C, the illustrative emergency event GUI 400 includes an illustrative event queue region 408. The illustrative event queue region 408 contains four queue elements 412, including a first queue element, designated as queue element (1), a second queue element, designated as queue element (2), a third queue element, designated as queue element (3), and a fourth queue element, designated as queue element (4). It should be appreciated that, in other embodiments, additional or fewer queue elements 412 may be displayed in the respective event queue region 408 of those other embodiments. It should be further appreciated that not all of the queue elements 412 have a reference line directed thereto, in order to preserve clarity of the illustration.

In use, a user interfacing with the emergency event GUI 400, and more particularly with the event queue region 408, may cycle through the queue of active emergency events by selecting one of the queue position adjustment elements 410, which allow navigation through the queue of active emergency events via single-event increment forwards or single-event decrement backwards, depending on which of the queue position adjustment elements 410 is selected. It should be appreciated that each of the queue elements 412 display (i.e., represent a reference to) one of the queue of active emergency events, in relative order of the queue. In other words, under certain conditions, such as the user has previously navigated through a portion of the queue via one of the queue position adjustment elements 410, the first queue element of the queue elements 412 may not represent the first (i.e., most recent) active emergency event of the queue of active emergency events.

Referring back to FIG. 3, in some embodiments, the event panel controller 102 may automatically display a representation of the presently triggered emergency event (e.g., denoted by text overlaying the queue element) in the first queue element (i.e., queue element (1)) and set the state of the first queue element as the presently selected queue element. Accordingly, the selected queue element dependent regions of the emergency event GUI 400 (i.e., the options menu region 414 of FIG. 4D and the event information region 420 of 4E), which are described below, can be populated with information relative to the presently triggered emergency event.

It should be appreciated that, under certain conditions (e.g., emergency responders interfacing with the emergency event GUI 400 at the time the presently triggered emergency event is received), such an automatic selection may not be desirable. Under such conditions, the method 300 may exit and not proceed with steps 322 and 324. In other words, the event panel controller 102 may not automatically update the selected queue element dependent regions of the emergency event GUI 400 with information relative to the presently triggered emergency event, under conditions in which doing so may alter the contents of the dependent regions during response to a previously triggered emergency.

In step 322, the event panel controller 102 updates an options menu region of the emergency event GUI 400 to display one or more options associated with the presently triggered emergency event. Each of the options may be mapped to an actionable option associated with the selected active emergency event, such as may be selected via a respective one of the queue elements 412. Such actionable options may include transmitting a command to one of the life safety system components 110 (e.g., one of the event notification devices 106) that is usable by the receiving life safety system component 110 to take an action associated with (i.e., determinable from) the received command.

Figure 4D:
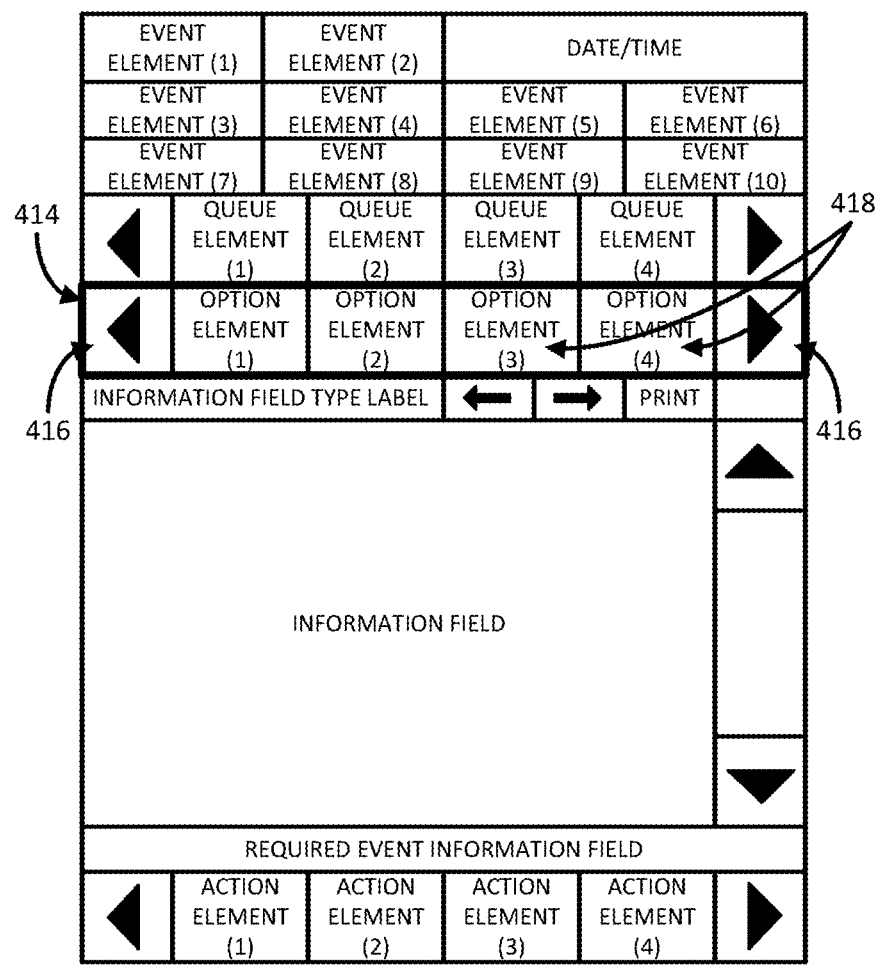

As shown in FIG. 4D, an illustrative options menu region 414 contains four option elements 418, including a first option element, designated as option element (1), a second option element, designated as option element (2), a third option element, designated as option element (3), and a fourth option element, designated as option element (4). It should be appreciated that, in other embodiments, additional or fewer option elements 418 may be displayed in the respective options menu region 414 of those other embodiments. It should be further appreciated that not all of the option elements 418 have a reference line directed thereto, in order to preserve clarity of the illustration.

In use, a user interfacing with the emergency event GUI 400, and more particularly with the options menu region 414, may cycle through a queue of menu options by selecting one of the queue position adjustment elements 416, which allow navigation through the queue of menu options via single-event increment forwards or single-event decrement backwards, depending on which of the queue position adjustment elements 410 is selected. It should be appreciated that each of the option elements 418 display (i.e., represent a reference to) one of the queue of menu option, in relative order of the queue of menu options corresponding to the selected one of the queue of active emergency events. In other words, under certain conditions, such as the user has previously navigated through a portion of the options menu queue via one of the queue position adjustment elements 416, the first option element of the option elements 418 may not represent the first option of the queue of menu options.

Figure 4E:
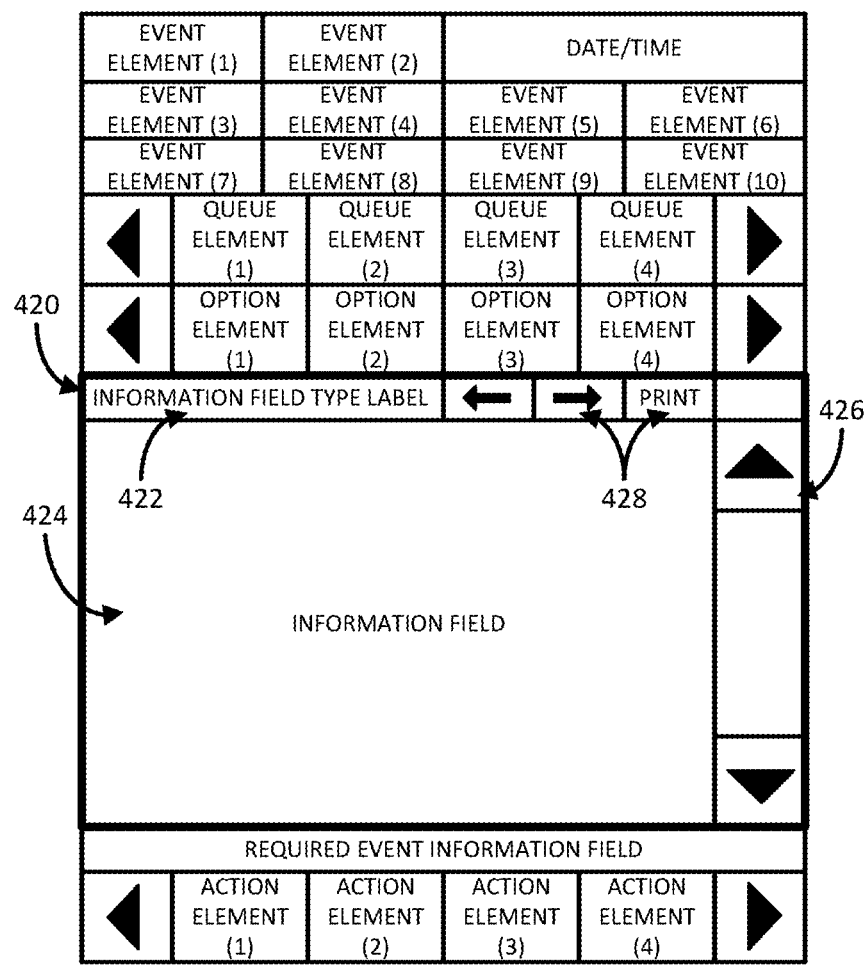

Referring back to FIG. 3, in step 324, the event panel controller 102 updates an event information region of the emergency event GUI 400 to display information associated with the presently triggered emergency event. As shown in FIG. 4E, an illustrative event information region 420 is shown that includes an information field type label 422 to display a textual label identifying the type of information being displayed, an information field 422 to display information associated with the presently selected event, a scrolling element 426 usable to scroll the displayed contents of the information field 422, and one or more command operation elements 428 usable to perform an action based on the type of information being displayed in the information field 424.

In some embodiments, the display area of the information field 424 may be adjusted. In such embodiments, the display area of the information field 424 may be adjusted based on the number of rows of event elements 404 displayed in the event indicator region 402. In other words, the information field 424 may be expanded or shrunk in size based on the portion of the emergency event GUI 400 that has been allocated to the event indicator region 402. Additionally or alternatively, in such embodiments, the display area of the information field 424 may be adjusted based on whether the options menu region 414 is being displayed in the emergency event GUI 400.

The information field type label 422 is configured to display a textual label identifying the type of information being displayed. The information field 422 is configured to display information associated with the presently selected event. The scrolling element 426 is usable to scroll the displayed contents of the information field 422. The one or more command operation elements 428 are usable to perform an action based on the type of information being displayed in the information field 424. Such actions may include navigating between available types of information to display in the information field 422, as well as any operations that can be used to perform an action, such as print, delete, save, etc.

Figure 4F:
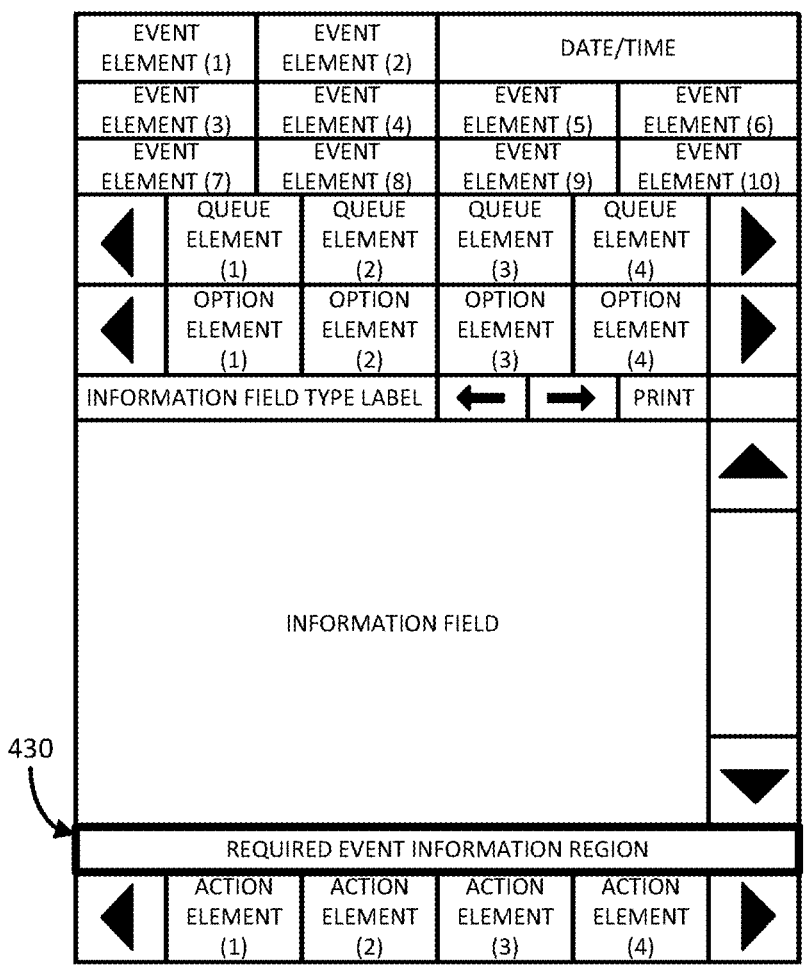

Referring now to FIG. 4F, an illustrative required event information region 430 of the illustrative emergency event GUI 400 is shown. The required event information region 430 is usable to display information that may be required as per safety standards based on region and type of life safety system 100 in which the event panel controller 102 is used. For example, in some embodiments, the required event information region 430 may include information about the most recent alarm, the oldest alarm, a highest priority alarm, and/or the like.

Figure 4G:
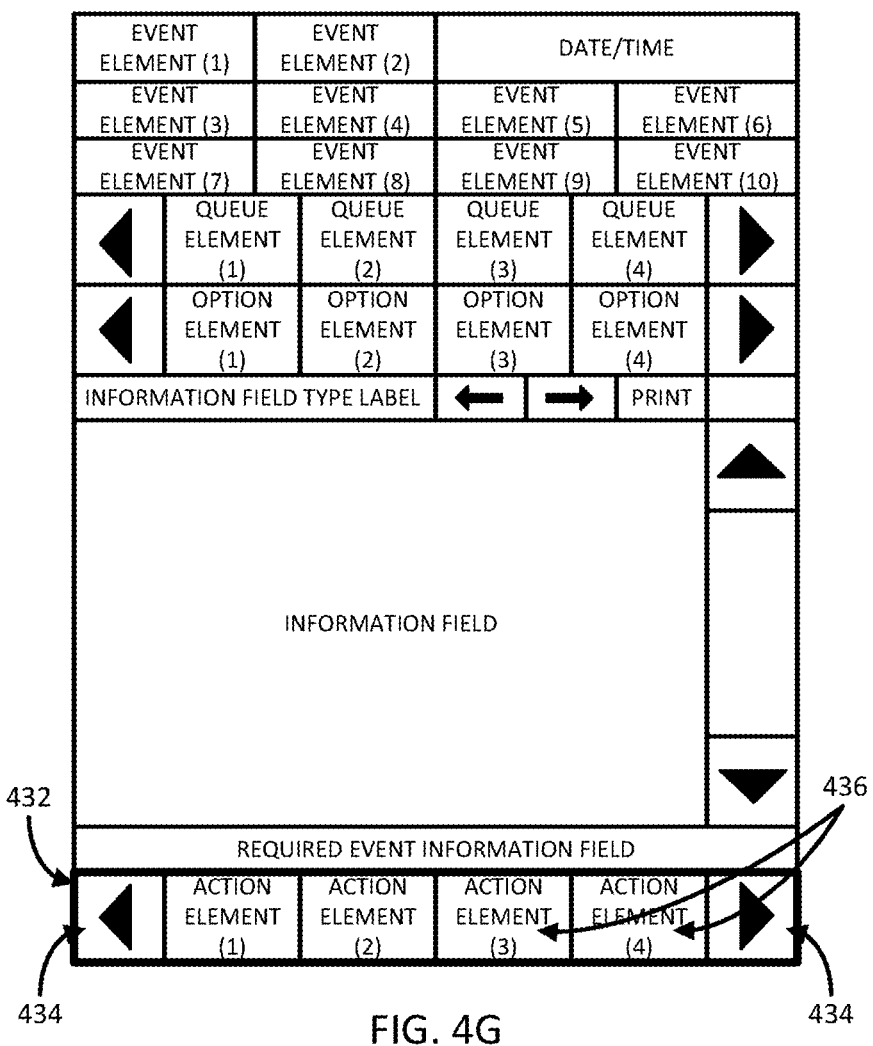

Referring now to FIG. 4G, an illustrative action region 432 of the illustrative emergency event GUI 400 is shown. The illustrative action region 432 contains four action elements 436, including a first action element, designated as action element (1), a second action element, designated as action element (2), a third action element, designated as action element (3), and a fourth action element, designated as action element (4). It should be appreciated that, in other embodiments, additional or fewer action elements 436 may be displayed in the respective action region 432 of those other embodiments. It should be further appreciated that not all of the action elements 436 have a reference line directed thereto, in order to preserve clarity of the illustration.

In use, a user interfacing with the emergency event GUI 400, and more particularly the action region 432, may cycle through a queue of available actions by selecting one of the queue position adjustment elements 434, which allow navigation through the queue of available actions via single-event increment forwards or single-event decrement backwards, depending on which of the queue position adjustment elements 434 is selected. The queue of available actions may include such actions as adjusting a setting related to the emergency event GUI 400 (e.g., language, font size, etc.), displaying information related to the event panel controller 102 and/or the emergency event GUI 400 (e.g., version information, vendor information, developer information, contact information, etc.), providing an authentication (e.g., sign-in) interface usable to login to the event panel controller 102 (i.e., view, interface with, and/or manipulate the emergency event GUI 400), etc.

It should be appreciated that each of the action elements 436 display (i.e., represent a reference to) one of the queue of available actions, in relative order of the queue. In other words, under certain conditions, such as the user has previously navigated through a portion of the queue via one of the queue position adjustment elements 434, the first action element of the action elements 436 may not represent the first available action of the queue of available actions.

While the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed is:

1. A life safety system interface, comprising:
an event panel controller communicatively coupled to one or more life safety system components, wherein the event panel controller is configured to:
trigger, in response to information received from the one or more life safety system components, an emergency event;
insert the triggered emergency event into a queue of active emergency events;
display, via a display of the event panel controller, an event indication corresponding to the triggered emergency event in an event indicator region of an emergency event graphical user interface (GUI) rendered to at least a portion of the display, wherein the event indication is displayed in one of a plurality of event elements of the event indicator region, wherein the one of the plurality of event elements of the event indicator region displays information of the triggered emergency event; and wherein each of the event elements remain visible to a user of the event panel controller; and update, via the display, a plurality of GUI elements of one or more selected queue element dependent regions of the emergency event GUI based on the triggered emergency event;

wherein to update the plurality of GUI elements of the one or more selected queue element dependent regions of the emergency event GUI based on the triggered emergency event comprises to update one or more GUI elements of an event information region of the emergency event GUI, and wherein the GUI elements of the event information region include an information field to display detailed information associated with one of the active emergency events corresponding to a selected one of the queue elements associated with that one of the active emergency events and an information field type label to identify a type of information displayed in the information field.

2. The life safety system of claim 1, wherein the event panel controller is communicatively coupled to the one or more life safety system components via a local area network.

3. The life safety system of claim 1, wherein the event panel controller is further configured to transmit a notification command to one or more of the life safety system components, and wherein the notification command is usable to perform an action based thereon.

4. The life safety system of claim 1, wherein the event panel controller is further configured render, to the emergency event GUI, the event elements of the event indicator region based on one or more characteristics associated with a type of triggered emergency event represented by that event element.

5. The life safety system of claim 1, wherein to update the plurality of GUI elements of the one or more selected queue element dependent regions of the emergency event GUI based on the triggered emergency event comprises to update a plurality of option elements of an options menu region of the emergency event GUI, and wherein each of the plurality of option elements corresponds to an option associated with the triggered emergency event.

6. A life safety system interface, comprising:
an event panel controller communicatively coupled to one or more life safety system components, wherein the event panel controller is configured to:
trigger, in response to information received from the one or more life safety system components, an emergency event;
insert the triggered emergency event into a queue of active emergency events;
display, via a display of the event panel controller, an event indication corresponding to the triggered emergency event in an event indicator region of an emergency event graphical user interface (GUI) rendered to at least a portion of the display, wherein the event indication is displayed in one of a plurality of event elements of the event indicator region, wherein the one of the plurality of event elements of the event indicator region displays information of the triggered emergency event and wherein each of the event elements remain visible to a user of the event panel controller; and update, via the display, a plurality of GUI elements of one or more selected queue element dependent regions of the emergency event GUI based on the triggered emergency event;

wherein the event panel controller is further configured to display, via the display, a plurality of action elements in an action region of the emergency event GUI, wherein each of the action elements corresponds to one of a setting adjustment interface, an information display, and an authentication interface.

7. The life safety system of claim 1, wherein the event panel controller is further configured to display, via the display, information corresponding to at least one active emergency event in a required event information region of the emergency event GUI, wherein information displayed is based on required safety standards associated with a type of the life safety system.

8. The life safety system of claim 1, further comprising to display, via the display, at least a portion of the queue of active emergency events in a respective one of a plurality of queue elements of an event queue region of the emergency event GUI, wherein the plurality of queue elements of the event queue region includes one queue element of the plurality of queue elements to display information of the triggered emergency event; and
wherein each of the plurality of queue elements remain visible to a user of the event panel controller during use of the event panel controller.

9. A method for facilitating user interactions with a life safety system interface of an event panel controller, the method comprising:
triggering, by the event panel controller and in response to having received information from one or more life safety system components, an emergency event;
inserting, by the event panel controller, the triggered emergency event into a queue of active emergency events;
displaying, via a display of the event panel controller, an event indication corresponding to the triggered emergency event in an event indicator region of an emergency event graphical user interface (GUI) rendered to the display, wherein the event indication is displayed in one of a plurality of event elements of the event indicator region, wherein the one of the plurality of event elements of the event indicator region displays information of the triggered emergency event; and wherein each of the event elements remain visible to a user of the event panel controller during use of the event panel controller; and
updating, via the display, a plurality of GUI elements of one or more selected queue element dependent regions of the emergency event GUI based on the triggered emergency event;
wherein updating the plurality of GUI elements of the one or more selected queue element dependent regions of the emergency event GUI based on the triggered emergency event comprises updating one or more GUI elements of an event information region of the emergency event GUI, and wherein the GUI elements of the event information region include an information field to display detailed information associated with one of the active emergency events corresponding to a selected one of the queue elements associated with that one of the active emergency events and an information field type label to identify a type of information displayed in the information field.

10. The method of claim 9, wherein the event panel controller is communicatively coupled to the one or more life safety system components via a local area network.

11. The method of claim 9, further comprising transmitting, by the event panel controller, a notification command to one or more of the life safety system components, and wherein the notification command is usable to perform an action based thereon.

12. The method of claim 9, further comprising rendering, by the event panel controller, the event elements of the event indicator region of the emergency event GUI based on one or more characteristics associated with a type of triggered emergency event represented by that event element.

13. The method of claim 9, wherein updating the plurality of GUI elements of the one or more selected queue element dependent regions of the emergency event GUI based on the triggered emergency event comprises updating a plurality of option elements of an options menu region of the emergency event GUI, and wherein each of the plurality of option elements corresponds to an option associated with the triggered emergency event.

14. A method for facilitating user interactions with a life safety system interface of an event panel controller, the method comprising:
    triggering, by the event panel controller and in response to having received information from one or more life safety system components, an emergency event;
    inserting, by the event panel controller, the triggered emergency event into a queue of active emergency events;
    displaying, via a display of the event panel controller, an event indication corresponding to the triggered emergency event in an event indicator region of an emergency event graphical user interface (GUI) rendered to the display, wherein the event indication is displayed in one of a plurality of event elements of the event indicator region, wherein the one of the plurality of event elements of the event indicator region displays information of the triggered emergency event and wherein each of the event elements remain visible to a user of the event panel controller during use of the event panel controller; and
    updating, via the display, a plurality of GUI elements of one or more selected queue element dependent regions of the emergency event GUI based on the triggered emergency event;
    further comprising displaying, via the display, a plurality of action elements in an action region of the emergency event GUI, wherein each of the action elements corresponds to one of a setting adjustment interface, an information display, and an authentication interface.

15. The method of claim 9, further comprising displaying, via the display, required information in a required event information region of the emergency event GUI, wherein the required information corresponds to at least one active emergency event, and wherein the required information displayed is based on required safety standards associated with an application type of the life safety system.

16. The method of claim 9, further comprising displaying, via the display, at least a portion of the queue of active emergency events in a respective one of a plurality of queue elements of an event queue region of the emergency event GUI, wherein the plurality of queue elements of the event queue region includes one queue element of the plurality of queue elements to display information of the triggered emergency event; and
    wherein each of the plurality of queue elements remain visible to a user of the event panel controller during use of the event panel controller.

* * * * *